United States Patent
Minagawa

(10) Patent No.: US 7,256,524 B2
(45) Date of Patent: Aug. 14, 2007

(54) AXIAL GAP ELECTRIC MOTOR

(75) Inventor: Yuusuke Minagawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/185,745

(22) Filed: Jul. 21, 2005

(65) Prior Publication Data

US 2006/0028081 A1    Feb. 9, 2006

(30) Foreign Application Priority Data

Aug. 6, 2004    (JP)    ............................ 2004-230725

(51) Int. Cl.
*H02K 21/12*    (2006.01)

(52) U.S. Cl. ................ 310/156.36; 310/112; 310/114; 310/266

(58) Field of Classification Search ..............................
310/156.32–156.36, 156.48, 112, 114, 266, 310/268
See application file for complete search history.

(56) References Cited

U.S. PATENT DOCUMENTS

| 5,117,141 | A | 5/1992 | Hawsey et al. | |
| 5,907,210 | A * | 5/1999 | Chaix | 310/268 |
| 5,955,809 | A * | 9/1999 | Shah | 310/198 |
| 6,291,963 | B2 | 9/2001 | Nakano | |
| 6,977,454 | B2 * | 12/2005 | Hsu | 310/171 |
| 2003/0071537 | A1 | 4/2003 | Chen | |
| 2003/0189388 | A1 | 10/2003 | Hashimoto et al. | |
| 2005/0179336 | A1 * | 8/2005 | Hasebe et al. | 310/268 |

FOREIGN PATENT DOCUMENTS

| DE | 102 07 018 A1 | 8/2003 |
| JP | 11-341758 A | 12/1999 |
| JP | 2000-224836 A | 8/2000 |
| JP | 2000-253635 A | 9/2000 |
| JP | 2003-88032 A | 3/2003 |
| WO | WO 02/056443 A2 | 7/2002 |
| WO | WO 03/069763 A1 | 8/2003 |

* cited by examiner

*Primary Examiner*—Dang Le
(74) *Attorney, Agent, or Firm*—Foley & Lardner LLP

(57) ABSTRACT

First and second stators are arranged on mutually spaced positions of an imaginary common axis, and first and second rotors are coaxially and rotatably arranged on mutually spaced positions of the imaginary common axis between the first and second stators.

21 Claims, 8 Drawing Sheets

FIG.5A FIG.5B
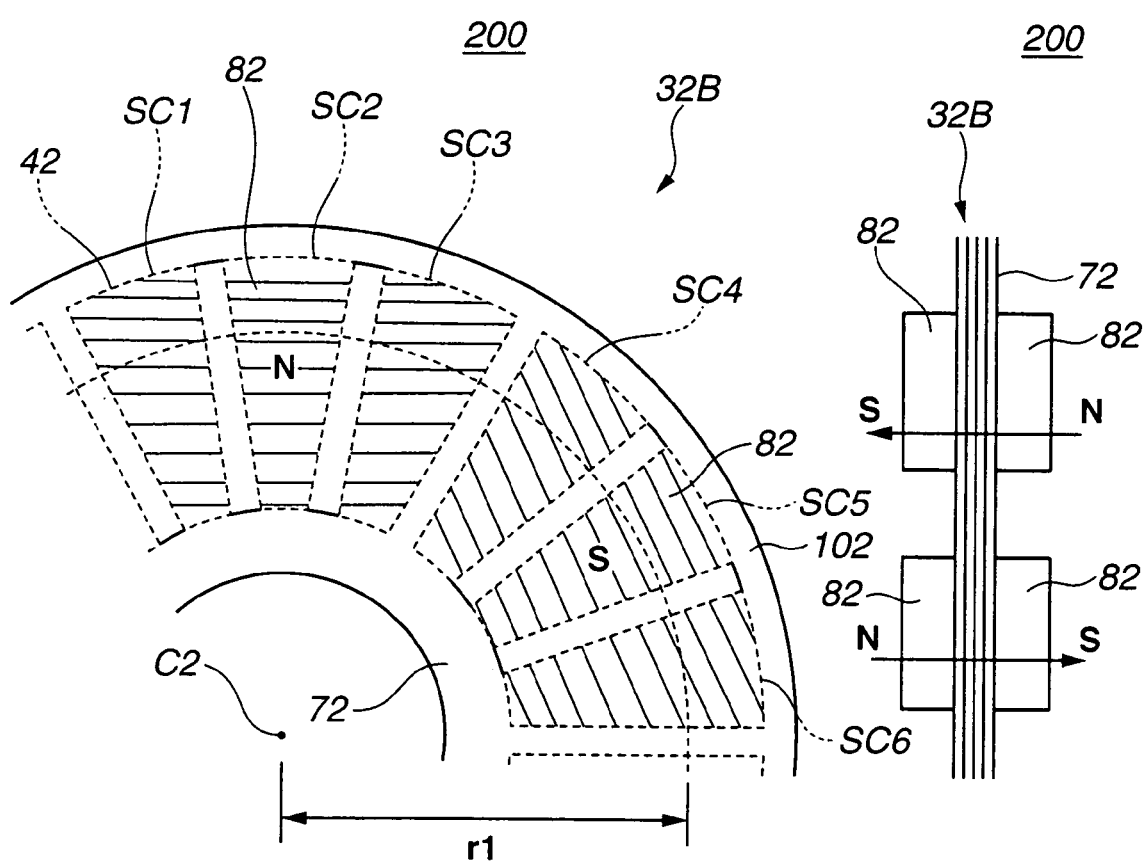

FIG.7A
FIG.7B
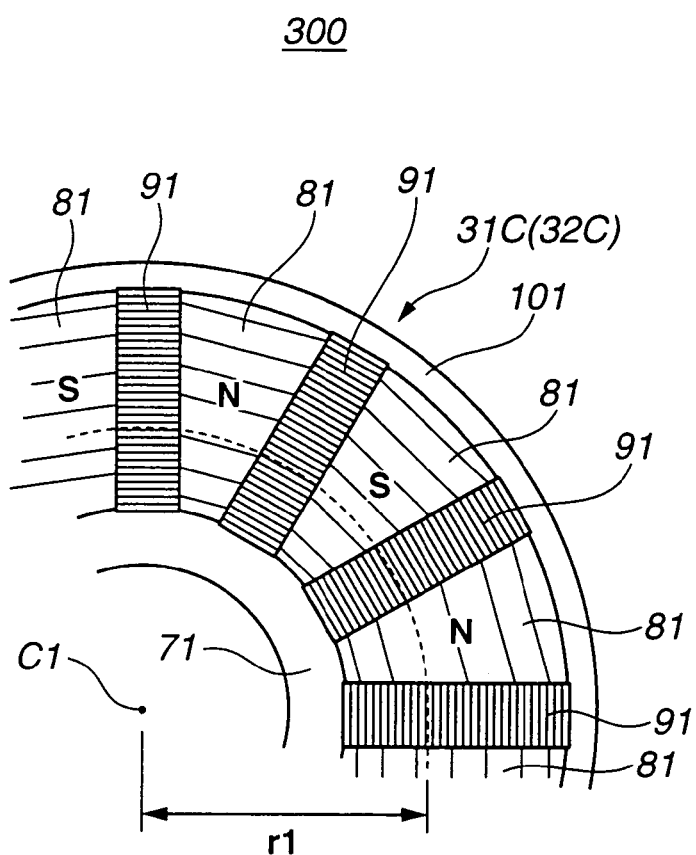
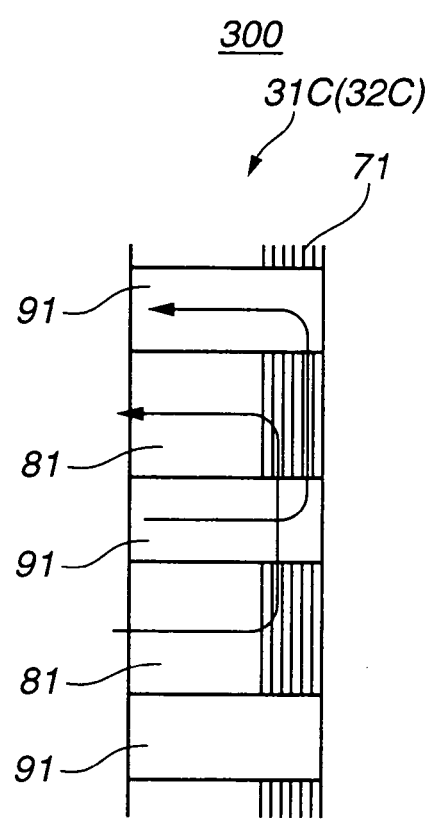

AXIAL GAP ELECTRIC MOTOR

BACKGROUND OF THE INVENTION

1. Field of the Invention

The present invention relates in general to electric motors and more particularly to the electric motors of an axial gap type which comprises a rotor shaft that is rotatable about its axis, at least one rotor that is fixed to the rotor shaft to rotate therewith and at least one stator that is disposed around the rotor shaft and axially spaced from the rotor.

2. Description of the Related Art

Hitherto, various radial gap electric motors have been proposed and put into practical use particularly in the field of power generators that need higher power density and lower heat generation. Some of them are disclosed in Japanese Laid-open Patent Applications, Tokkaihei 11-341758 and Tokkai 2000-224836.

The motor shown by 11-341758 comprises a cylindrical stator, an outer rotor rotatably disposed around the cylindrical stator and an inner rotor rotatably disposed in the cylindrical stator. While, the motor shown by 2000-224836 comprises a cylindrical stator, an outer rotor rotatably arranged in a diametrically outer side in the cylindrical stator and an inner rotor rotatably arrange in a diametrically inner side in the cylindrical stator.

In both of the motors mentioned hereinabove, by feeding the stator with a compound current, the outer and inner rotors are forced to rotate independently from each other.

In the motor of the latter reference, viz., 2000-224836, it is considerably difficult to provide the inner rotor with a sufficient size due to the inevitably limited space defined in the diametrically inner area of the cylindrical stator, and thus, it is difficult to expect a sufficient torque from such small sized inner rotor. In view of this drawback, electric motors of the type of the former reference, viz., 11-341758 have been widely used in these days.

SUMMARY OF THE INVENTION

Besides the above-mentioned radial gap electric motors, axial gap electric motors are also known, some of which are of a double rotor type having two rotors that are rotatable independently from each other. In this type electric motor, the two rotors are rotatably arranged relative to a fixed single stator. Two output shafts or the like are used for the respective two rotors, that are coaxially installed for receiving the respective torque of the two rotors.

When the axial gap electric motors of the above-mentioned two rotor type are constructed to be powered by a compound current, it is necessary to arrange the two rotors at axially opposed sides of the stator respectively. However, in this case, stable supporting or holding of the stator relative to a motor case is quite difficult because of a complicated arrangement that is inevitably needed by the two rotors, the two output shafts and the single stator on a common axis.

Accordingly, it is an object of the present invention to provide an axial gap electric motor of two rotor type, which is free of the above-mentioned drawbacks.

That is, in accordance with the present invention, there is provided an axial gap electric motor which comprises two stators that are axially arranged and two rotors that are axially arranged between the two stators.

In accordance with a first aspect of the present invention, there is provided an axial gap electric motor which comprises first and second stators that are arranged on mutually spaced positions of an imaginary common axis in a manner to face each other; and a plurality of rotors that are coaxially and rotatably arranged on mutually spaced positions of the imaginary common axis between the first and second stators.

In accordance with a second aspect of the present invention, there is provided an axial gap electric motor which comprises annular first and second stators that are coaxially arranged around an imaginary common axis; annular first and second rotors that are coaxially and rotatably arranged on the imaginary common axis between the first and second stators; a hollow first rotor shaft that is rotatable about the imaginary common axis and has one axial end secured to a center portion of the first rotor to rotate therewith; a second rotor shaft that is rotatably received in the hollow first rotor shaft and has one axial end secured to a center portion of the second rotor to rotate therewith; and a case that houses therein the first and second stators, the first and second rotors, and the first and second rotor shafts.

BRIEF DESCRIPTION OF THE DRAWINGS

FIG. 5A is a view similar to FIG. 4A, but showing a part of a second rotor employed in the electric motor of the second embodiment of the present invention;

FIG. 5B is a development provided by developing given portions of the second rotor of FIG. 5A in a circumferential direction;

FIG. 7A is a schematically illustrated plan view of a part of a first or second rotor employed in the electric motor of the third embodiment;

FIG. 7B is a development provided by developing given portions of the rotor of FIG. 7A in a circumferential direction;

DETAILED DESCRIPTION OF THE EMBODIMENTS

In the following, various embodiments of the present invention will be described in detail with reference to the accompanying drawings.

For ease of understanding, the following description includes various directional terms, such as, right, left, upper, lower, rightward and the like. However, such terms are to be understood with respect to a drawing or drawings on which a corresponding part or portion is shown. Throughout the specification, substantially the same parts or portions are denoted by the same numerals.

Figure 1:
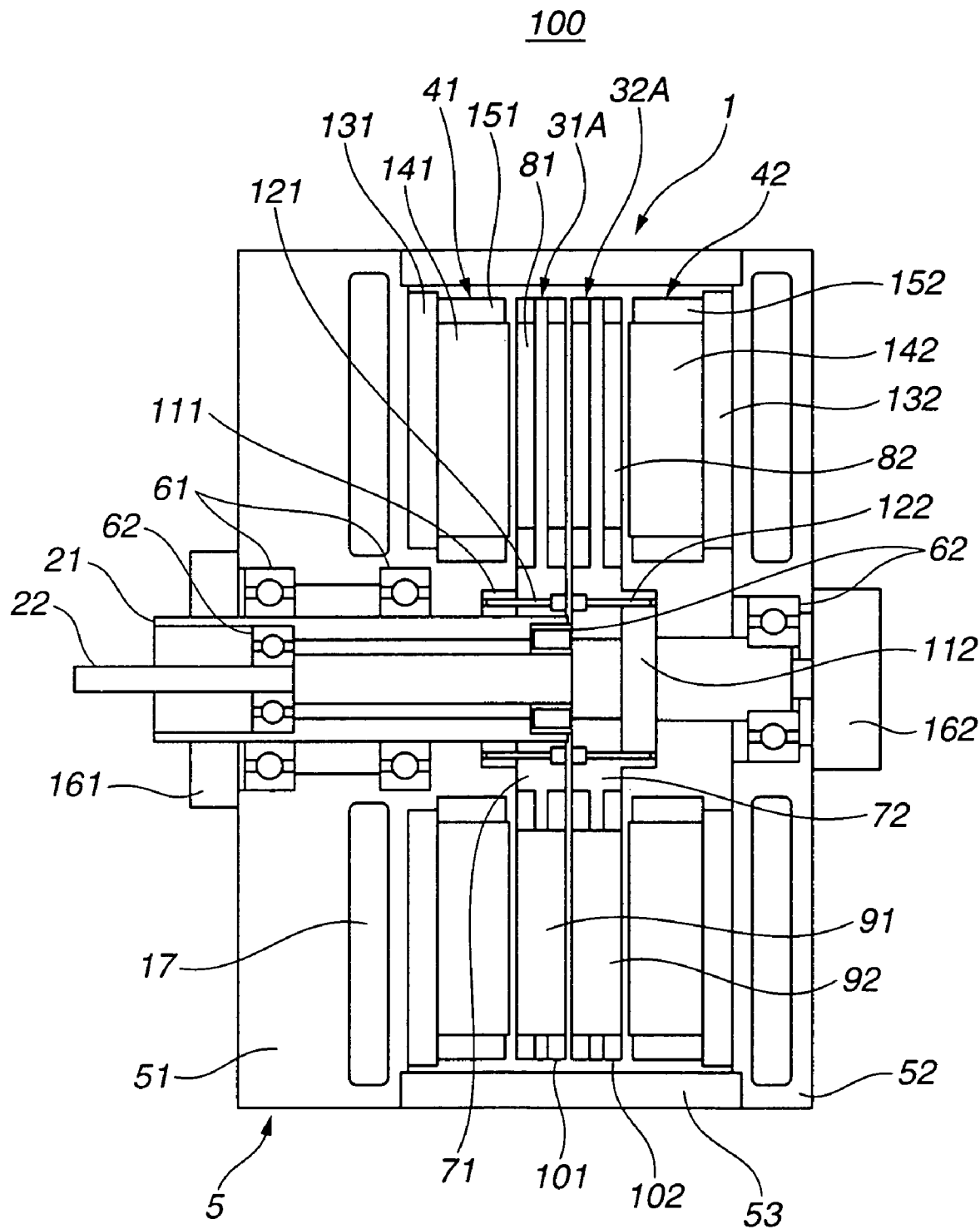
FIG. 1 is a schematically illustrated sectional view of an axial gap electric motor of a first embodiment of the present invention.

Referring to FIG. 1, there is shown in a sectioned manner an axial gap electric motor 100 which is a first embodiment of the present invention.

Motor 100 comprises a hollow first rotor shaft 21 and a second rotor shaft 22 that is concentrically and rotatably received in first rotor shaft 21, as shown.

First and second circular rotors 31A and 32A are concentrically connected to right ends of first and second rotor shafts 21 and 22 respectively, so that first rotor 31A and first rotor shaft 21 rotate like a single unit, and second rotor 32A and second rotor shaft 22 rotate like another single unit.

An annular first stator 41 and an annular second stator 42 are coaxially arranged around a common axis of first and second rotor shafts 21 and 22 in such a manner as to put therebetween first and second circular rotors 31A and 32A. As will be described in detail hereinafter, first and second stators 41 and 42 are secured to axially opposed portions of a motor case 5 respectively.

Motor case 5 comprises generally a circular left wall portion 51, a circular right wall portion 52 and a cylindrical intermediate wall portion 53 that extends between left and right wall portions 51 and 52, as shown.

As shown in the drawing, first stator 41 is located at a left position of first circular rotor 31A to face a left surface of rotor 31A, and second stator 42 is located at a right position of second circular rotor 32A to face a right surface of rotor 32A.

As shown, first rotor shaft 21 is rotatably held by motor case 5 by means of two bearings 61. While, second rotor shaft 22 is rotatably held by motor case 5 by means of three bearings 62. Two of bearings 62 are used for a relative rotation between first and second rotor shafts 21 and 22, as shown.

Each of first and second circular rotors 31A and 32A comprises a rotor back core 71 or 72, a plurality of magnets 81 or 82, a plurality of rotor cores 91 or 92 and an outer frame 101 or 102, as will be described in detail hereinafter.

For tight connection between first rotor shaft 21 and first rotor 31A, screw bolts 121 are used that extend between a raised annular portion 111 formed on first rotor shaft 21 and a base portion of rotor back core 71. More specifically, after passing through a hole formed in the base portion of rotor back core 71, each screw bolt 121 is screwed into a threaded bore formed in raised annular portion 111.

For tight connection between second rotor shaft 22 and second core 32, screw bolts 122 are used that extend between a raised annular portion 112 formed on the second rotor shaft 22 and a base portion of rotor back core 72. More specifically, after passing through a hole formed in the base portion of rotor back core 72, each screw bolt 122 is screwed into a threaded bore formed in raised annular portion 112.

Each of first and second stators 41 and 42 comprises a stator back core 131 or 132, a plurality of stator cores 141 or 142 and a plurality of stator coils 151 or 152.

For tight connection between first stator 41 and motor case 5, stator back core 131 is secured to the left wall surface of motor case 5, and for tight connection between second stator 42 and motor case 5, stator back core 132 is secured to the right wall surface of motor case 5, as shown.

As shown, around a left end portion of first hollow rotor shaft 21, there is arranged a first encoder device 161 that senses an angular position of first rotor shaft 21. Around a right end portion of second rotor shaft 22, there is arranged a second encoder device 162 that senses an angular position of second rotor shaft 22.

Motor case 5 is formed with a water jacket 17 in and through which cooling water flows to cool the motor 100.

Each of stator cores 141 and 142 is a member in and through which magnetic fluxes flow in a direction of the common axis of first and second rotor shafts 21 and 22. For producing such magnetic fluxes, each stator coil 151 or 152 is put around the corresponding stator core 141 or 142.

Stator back core 131 or 132 functions to orient the magnetic fluxes of stator cores 141 or 142 around the common axis and force the magnetic fluxes to shift toward another stator core 141 or 142.

It is to be noted that the number of magnetic poles of magnets 81 that constitute first rotor 31A differs from the number of magnetic poles of magnets 82 that constitute second rotor 32. Thus, first rotor 31A and second rotor 32A can rotate at different rotation speeds independently when first and second stators 41 and 42 are fed with a compound current, like in the above-mentioned radial gap electric motor.

The detail of the compound current is described in U.S. Pat. No. 6,291,963 granted to Masaki Nakano on Sep. 18, 2001.

When, in operation, first and second stators 41 and 42 are fed with a compound current, first and second rotors 31A and 32A are forced to rotate independently. Rotation of first rotor 31A is transmitted to an external element (not shown) through first rotor shaft 21, and rotation of second rotor 32A is transmitted to another external element (not shown) through second rotor shaft 22.

In the following, the construction of first and second rotors 31A and 32A will be described in detail with reference to FIGS. 2A, 2B, 3A and 3B.

Figure 2A:
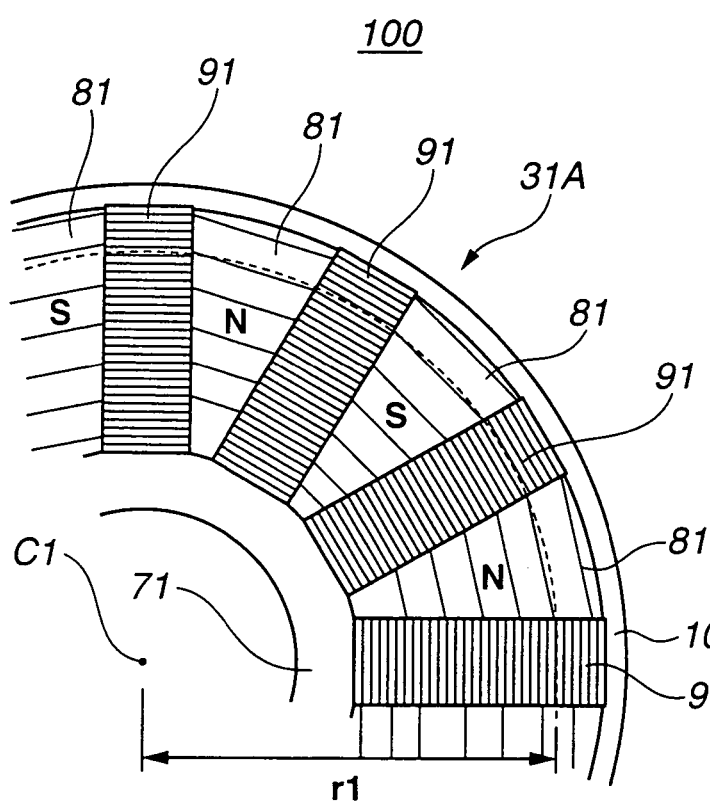
FIG. 2A is a schematically illustrated plan view of a part of a first rotor employed in the electric motor of the first embodiment of FIG. 1.
Figure 2B:
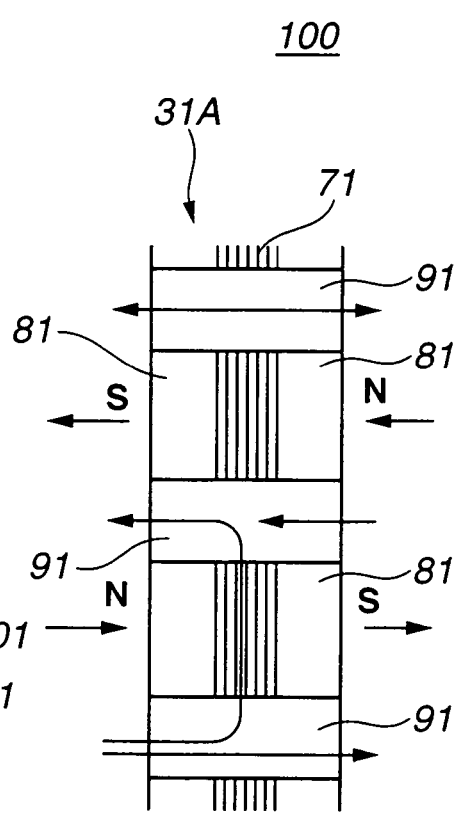
FIG. 2B is a development provided by developing given portions of the first rotor of FIG. 2A in a circumferential direction.

Referring to FIGS. 2A and 2B, there is shown in detail first rotor 31A.

FIG. 2A is a partial plan view of first rotor 31A, and FIG. 2B is a development provided by developing, in a circumferential direction, portions that show a radius "r1" from a center "C1" of first rotor 31A.

As is seen from these drawings, first rotor 31A comprises a rotor back core 71, a plurality of magnets 81 that are put on opposed surfaces of rotor back core 71 in a manner to have magnetic surfaces in an axial direction, rotor cores 91 each being arranged between adjacent two of magnets 81 while piercing rotor back core 71, and an outer frame 101 that tightly holds magnets 81 and rotor cores 91 relative to rotor back core 71.

As shown, magnets 81 are arranged in a manner to alternatively change the N and S poles in a circumferential direction.

Rotor cores 91 are constructed of a magnetic material.

In the illustrated first embodiment, magnets 81 are arranged to constitute six pairs of magnet groups.

Rotor back core 71 and each rotor core 91 are constructed of a plurality of flat magnetic steel sheets that are put on one another. However, if desired, such core 71 and rotor core 91 may be constructed of a pressed powder magnetic material.

As is seen from these drawings, particularly FIG. 2A, flat magnetic steel sheets of rotor core 91 are piled in a radial direction with respect to center "C1" of first rotor 31A.

Thus, as is understood from the arrows illustrated in FIG. 2B, under operation of motor 100, there are produced loops of magnetic flux each flowing from a surface of stator 41 into rotor 31A and flowing through rotor 31A in an axial direction.

Due to the nature of the magnetic steel sheets piled in the above-mentioned manner, a tendency of shifting flowing of the magnetic flux toward a periphery of rotor 31A is increased. Accordingly, penetration of the magnetic flux through rotor 31A (or 32A) is carried out under the magnetic resistance being reduced in magnitude. Furthermore, due to the same reason, loops of reluctance torque are obtained, which brings about increase in torque of the motor 100 by a degree corresponding to the reluctance torque.

Figure 3A:
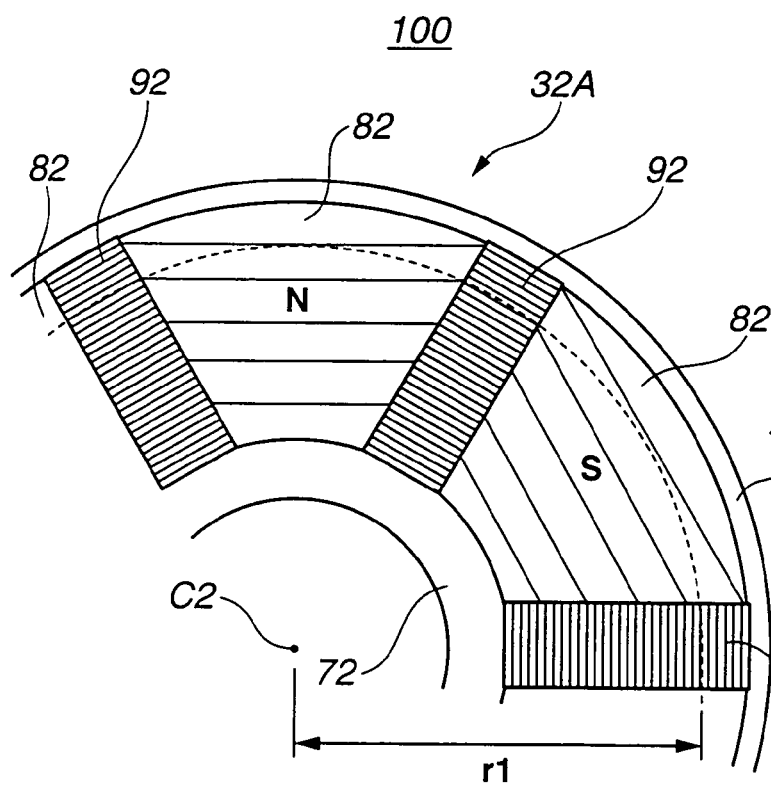
FIG. 3A is a view similar to FIG. 2A, but showing a part of a second rotor employed in the electric motor of the first embodiment of FIG. 1.
Figure 3B:
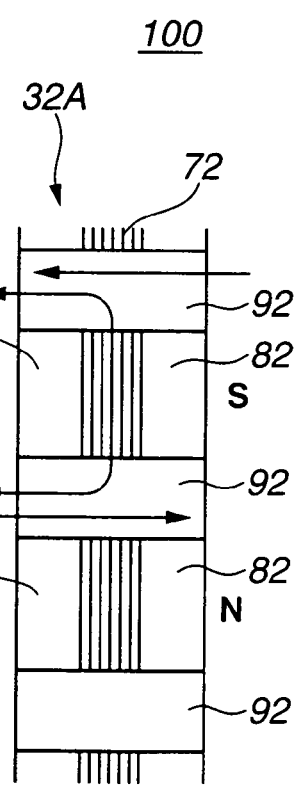
FIG. 3B is a development provided by developing given portions of the second rotor of FIG. 3A in a circumferential direction.

Referring to FIGS. 3A and 3B, there is shown in detail second rotor 32A.

FIG. 3A is a partial plan view of second rotor 32A, and FIG. 3B is a development provided by developing, in a circumferential direction, portions that show a radius "r1" from a center "C2" of second rotor 32A.

As is seen from the drawings, like in the above-mentioned first rotor 31A, second rotor 32A comprises rotor back core 72, a plurality of magnets 82 that are put on opposed surfaces of rotor back core 72 in a manner to have magnetic surfaces in an axial direction, rotor cores 92 each being arranged between adjacent two magnets 82 while piercing rotor back core 72, and outer frame 102 that tightly holds magnets 82 and rotor cores 92 relative to rotor back core 72. Rotor cores 92 are constructed of a magnetic material.

In the illustrated first embodiment 100, magnets 82 are arranged to constitute three pairs of magnet groups.

Other constructional features of this second rotor 32A are substantially the same as those of the above-mentioned first rotor 31A, and thus, explanation of such constructional features will be omitted.

As is seen from FIGS. 3A and 3B, particularly FIG. 3A, flat magnetic steel sheets of rotor core 92 are piled in a radial direction with respect to center "C2" of second rotor 32A. Thus, as is understood from the arrows illustrated in FIG. 3B, there are produced loops of magnetic flux each flowing from a surface of stator 42 into rotor 32A and flowing through rotor 32A in an axial direction. Due to nature of the magnetic steel sheets piled in the above-mentioned manner, a tendency of shifting flowing of the magnetic flux toward a periphery of rotor 32A is increased, like in the above-mentioned first rotor 31A. Thus, penetration of the magnetic flux through rotor 32A is carried out under the magnetic resistance being reduced in magnitude. Furthermore, due to the same reason, loops of reluctance torque are obtained, which induces increase in torque of the motor 100 like in case of first rotor 31.

Referring to FIGS. 4A and 4B, and 5A and 5B, there are shown first and second rotors 31B and 32B that are employed in a second embodiment 200 of the present invention.

Figure 4A:
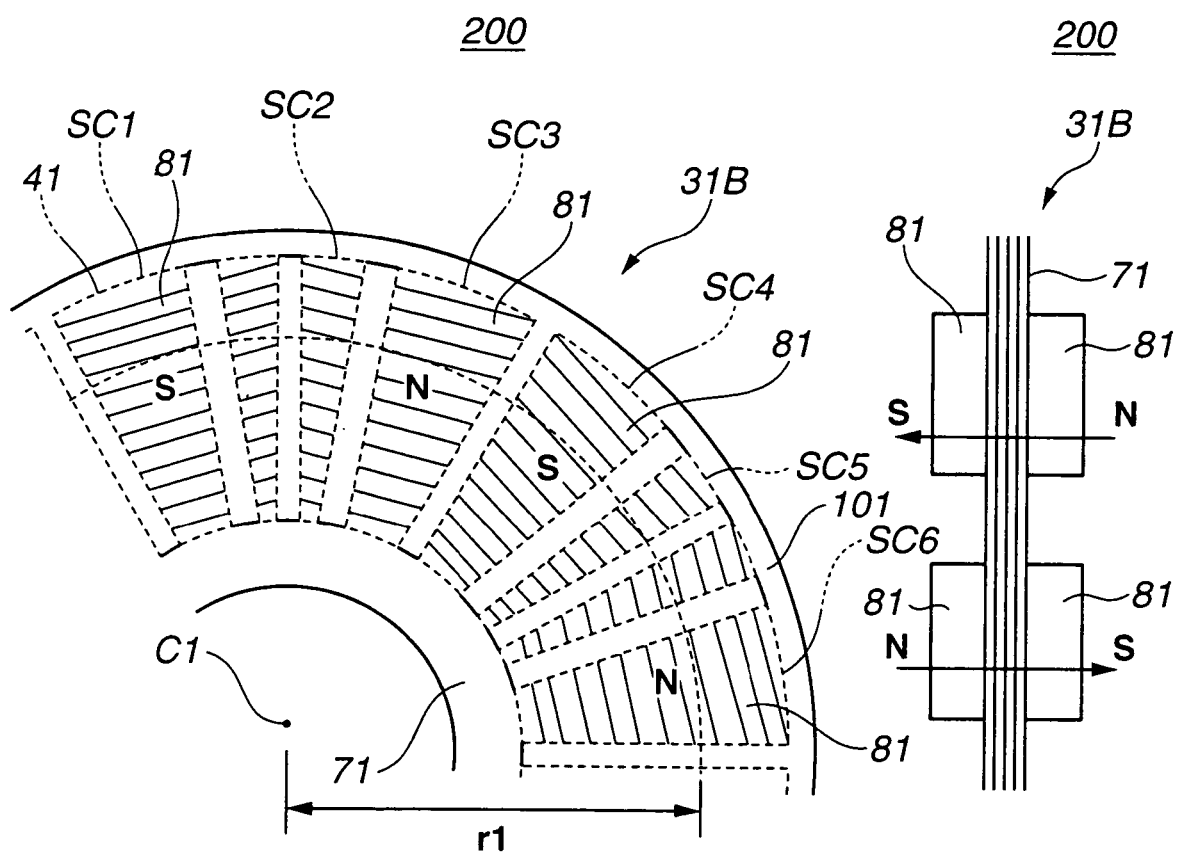
FIG. 4A is a view similar to FIG. 2A, but showing a part of a first rotor employed in an axial gap electric motor of a second embodiment of the present invention.

For clarifying a positional relationship between first or second rotor 31B or 32B and corresponding first or second stator 41 or 42, stator cores SC1, SC2, SC3, SC4, SC5 and SC6 of the stator 41 or 42 are illustrated in FIG. 4A or 5A by broken lines.

Figure 4B:
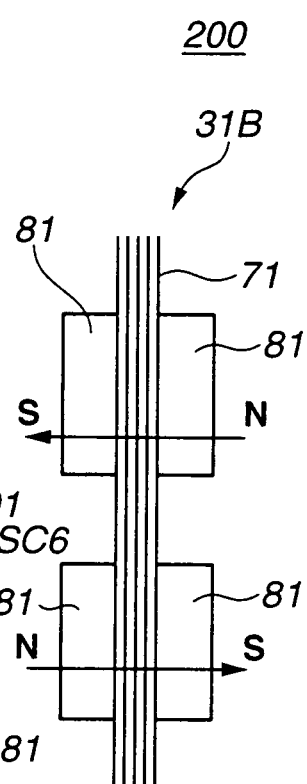
FIG. 4B is a development provided by developing given portions of the first rotor of FIG. 4A in a circumferential direction.

Referring to FIGS. 4A and 4B, there is shown first rotor 31B.

FIG. 4A is a partial plan view showing first rotor 31B as viewed behind first stator 41 illustrated by broken lines, and FIG. 4B is a development provided by developing, in a circumferential direction, portions that show a radius "r1" from a center "C1" of first rotor 31B.

As is seen from these drawings, first rotor 31B comprises a rotor back core 71, a plurality of magnets 81 that are put on opposed surfaces of rotor back core 71 in a manner to have magnetic surfaces in an axial direction and an outer frame 101 that tightly holds magnets 81 relative to rotor back core 71.

Also, in this second embodiment, magnets 81 are arranged to constitute six pairs of magnet groups, like in the case of the first embodiment.

As is understood from the above, in this second embodiment 200, means that corresponds to rotor cores 91 employed in the above-mentioned first embodiment 100 is not employed. Thus, as is seen from FIG. 4B, loops of reluctance torque are not produced and thus generation of reluctance torque is not expected from first rotor 31B of this second embodiment 200.

Referring to FIGS. 5A and 5B, there is shown second rotor 32B.

FIG. 5A is a partial plan view of second rotor 32B, and FIG. 5B is a development provided by developing, in a circumferential direction, portions that show a radius "r1" from a center "C2" of second rotor 32B.

As is seen from the drawings, like in the above-mentioned first rotor 31B, second rotor 32B comprises a rotor back core 72, a plurality of magnets 82 that are put on opposed surfaces of rotor back core 72 in a manner to have magnetic surfaces in an axial direction, and an outer frame 102 that tightly holds magnets 82 relative to rotor back core 72.

In the illustrated second embodiment 200, magnets 82 are arranged to constitute three pairs of magnet groups.

Other constructional features of this second rotor 32B are substantially the same as those of the above-mentioned first rotor 31B, and thus, explanation of such constructional features will be omitted. Because of lack of means that corresponds to rotor cores 91, generation of reluctance torque is not expected from second rotor 32B of this second embodiment 200.

Figure 6:
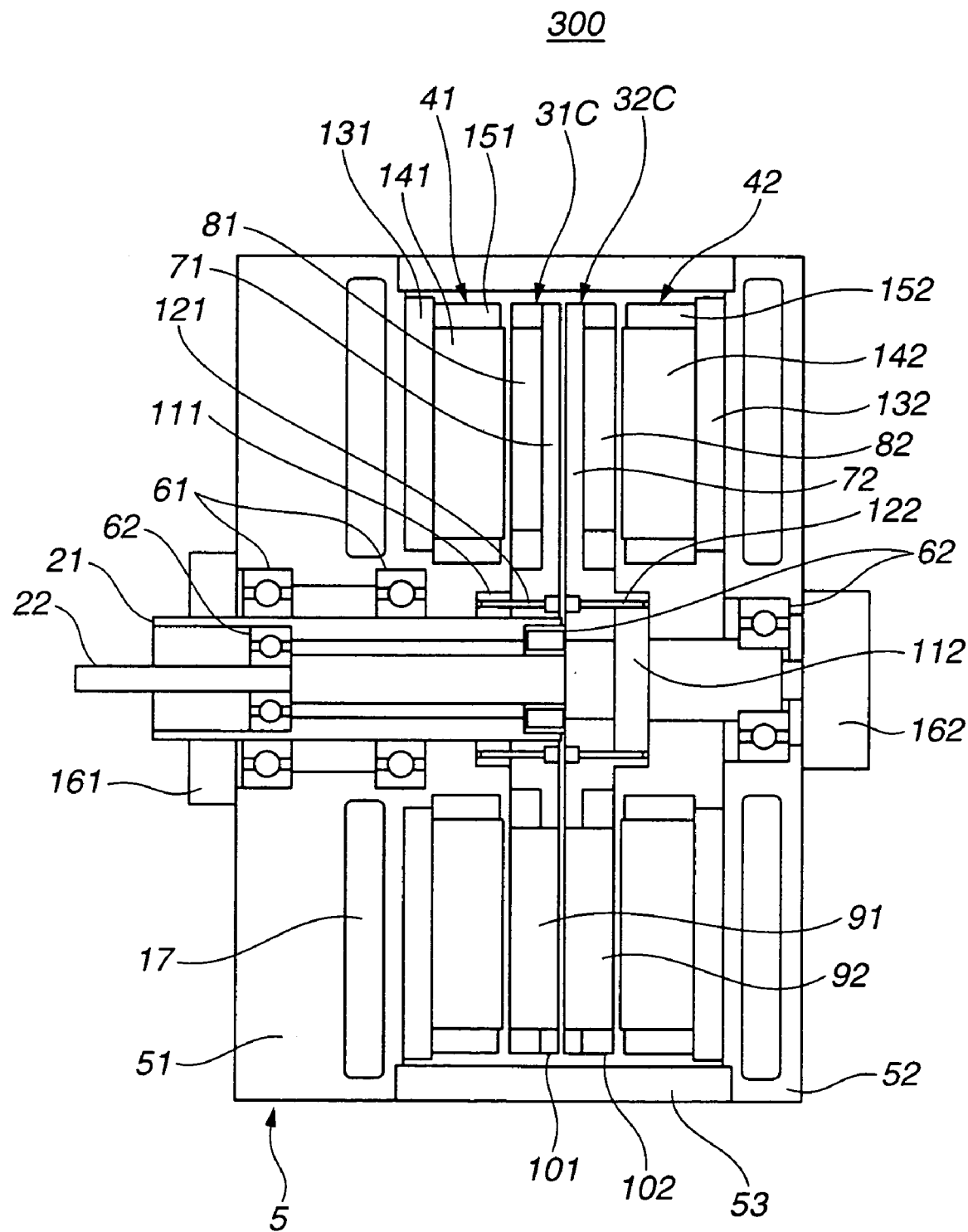
FIG. 6 is a view similar to FIG. 1, but showing an axial gap electric motor of a third embodiment of the present invention.

Referring to FIG. 6, there is shown in a sectional manner an axial gap electric motor 300 which is a third embodiment of the present invention.

Since motor 300 of this third embodiment is similar in construction to the above-mentioned motor 100 of the first embodiment of FIG. 1, only first and second rotors 31C and 32C that are different from those of the first embodiment 100 will be described in detail in the following.

Referring to FIGS. 7A and 7B, there is shown first rotor 31C employed in motor 300 of the third embodiment.

As will be described hereinafter, the construction of first rotor 31C may be used in second rotor 32C.

FIG. 7A is a partial plan view of first rotor 31C (or second rotor 32C), and FIG. 7B is a development provided by developing, in a circumferential direction, portions that show a radius "r1" from a center "C1" of first rotor 31C (or second rotor 32C).

As is seen from the drawings, that is, from FIGS. 7A and 7B, first rotor 31C comprises a rotor back core 71, a plurality of magnets 81 that are put on one surface of rotor back core 71 in a manner to have magnetic surfaces in an axial direction, rotor cores 91 each being arranged between adjacent two magnets 81 while being embedded at one end in core back core 71, and an outer frame 101 that tightly holds magnets 81 and rotor cores 91 relative to rotor back core 71.

Rotor back core 71 and each of rotor cores 91 are constructed of a plurality of flat magnetic steel sheets that are put on one another. However, if desired, such core 71 and rotor core 91 may be constructed of a pressed powder of magnetic material. Furthermore, if desired, rotor cores 91 may be removed like in the above-mentioned second embodiment 200.

It is to be noted that second rotor 32C may employ the construction of the above-mentioned first rotor 31C.

Under operation of motor 300, there are produced loops of magnetic flux as is shown by arrows in FIG. 7B.

Figure 8A:
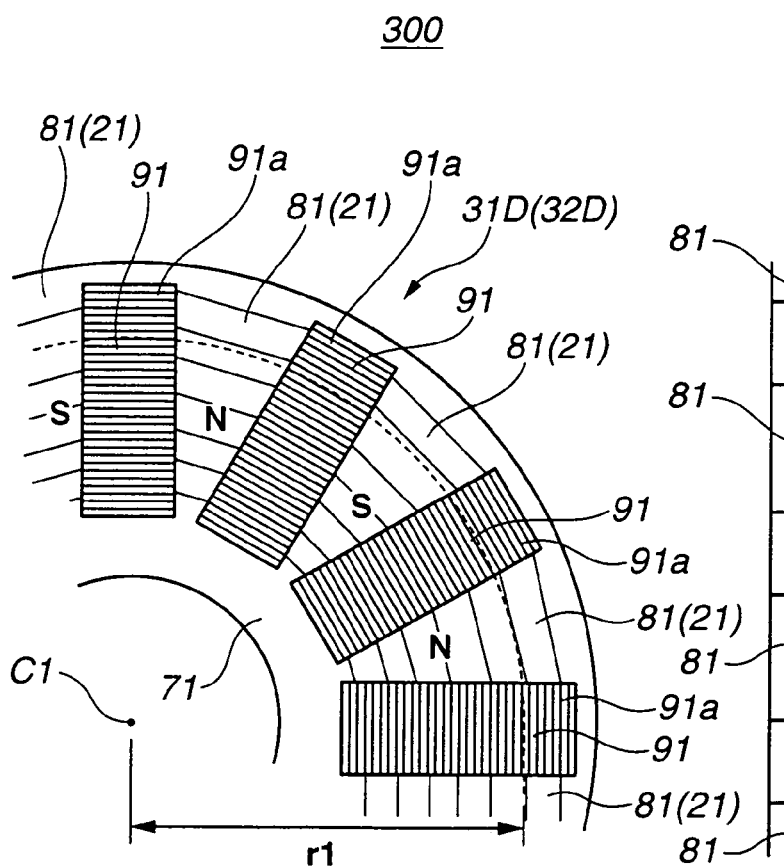
FIG. 8A is a schematically illustrated plan view of a part of another first or second rotor that is employable in the electric motor of the third embodiment.
Figure 8B:
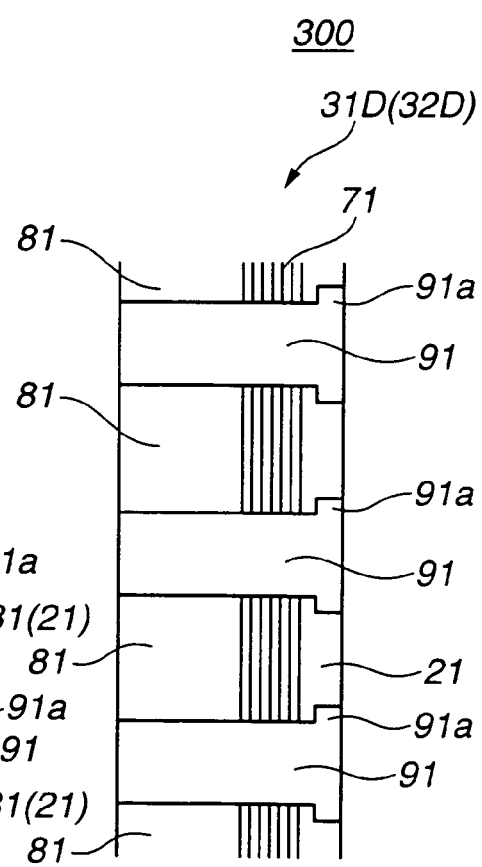
FIG. 8B is a development provided by developing given portions of the rotor of FIG. 8A in a circumferential direction.

Referring to FIGS. 8A and 8B, there is shown first and second rotors 31D employable in motor 300 of the third embodiment.

As will be described hereinafter, the construction of first rotor 31D may be used in second rotor 32D.

FIG. 8A is a partial plan view of first rotor 31D (or second rotor 32D), and FIG. 8B is a development provided by developing, in a circumferential direction, portions that show a radius "r1" from a center "C1" of first rotor 31D (or second rotor 32D).

As is seen from these drawings, that is, from FIGS. 8A and 8B, first rotor 31D comprises a rotor back core 71, a plurality magnets 81 that are put on one surface of rotor back core 71 in a manner to have magnetic surfaces in an axial direction, and a plurality of rotor cores 91 each being arranged between adjacent two magnets 81 while piercing rotor back bore 71. It is to be noted that first rotor 31D has no means corresponding the above-mentioned outer frame 101 (FIG. 7A).

As shown in FIGS. 8A and 8B, each rotor core 91 has at a radially outer end thereof an enlarged flange 91a that is snugly received in a recess formed in an annular supporting member 21 that is attached to the other surface of core back core 71.

Each rotor core 91 is welded to annular supporting member 21. Preferably, annular supporting member 21 is constructed of a non-magnetic metal.

As is described hereinabove, the construction of first rotor 31D may be applied to second rotor 32D.

Due to provision of annular supporting member 21, first rotor 31D or second rotor 32D has a much increased mechanical strength.

If both first and second rotors 31D and 32D have the above-mentioned construction with annular supporting member 21, the flow of the magnetic flux between the two rotors 31D and 32D is much smoothed. If annular supporting member 21 is constructed of a non-magnetic metal, an eddy-current loss caused by permeation of magnetic flux can be reduced.

As will be understood from the foregoing description, in accordance with the present invention, there is provided an axial gap electric motor in which two rotors are independently arranged between two stators.

The number of the magnets held by one rotor may be different from that of the magnets held by the other rotor. With this type arrangement, the two rotors can be independently driven while producing substantially the same torque. Because of the two stators are arranged outside of the two rotors, fixing of the two stators to the motor case is easily made.

In the above-mentioned embodiments 100, 200 and 300, two rotors, that is, first and second rotors (31A, 32A), (31B, 32B), (31C, 32C) or (31D, 32D) are arranged between first and second stators 41 and 42, more than two rotors may be arranged between the two stators 41 and 42.

The entire contents of Japanese Patent Application 2004-230725 filed Aug. 6, 2004 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An axial gap electric motor comprising:
   first and second stators that are arranged on mutually spaced positions of an imaginary common axis in a manner to face each other, wherein both stators are configured to be supplied with a compound current;
   a plurality of rotors that are coaxially and rotatably arranged on mutually spaced positions of the imaginary common axis between the first and second stators; and
   wherein a number of magnetic poles constituted by magnets of at least one rotor differ from a number of magnetic poles constituted by magnets of another rotor.

2. An axial gap electric motor as claimed in claim 1, in which each of the rotors comprises:
   a rotor back core;
   a plurality of magnets that are put on opposed surfaces of the rotor back core; and
   a plurality of rotor cores each being constructed of a magnetic material and arranged between two adjacent magnets while piercing the rotor back core.

3. An axial gap electric motor as claimed in claim 2, further comprising an outer frame that is arranged to tightly hold the magnets and the rotor cores relative to the rotor back core.

4. An axial gap electric motor as claimed in claim 2, in which the magnets are arranged in a manner to alternately change N and S poles thereof in a circumferential direction around the imaginary common axis.

5. An axial gap electric motor as claimed in claim 4, in which the rotor back core and each of rotor cores are constructed of a plurality of flat magnetic steel sheets that are put on one another, and in which the flat magnetic steel sheets of each rotor core are piled in a radial direction with respect to the imaginary common axis.

6. An axial gap electric motor as claimed in claim 1, in which each of the rotors comprises:
   a rotor back core;
   a plurality of magnets that are put on opposed surfaces of the rotor back core; and
   an outer frame that tightly holds the magnets relative to the rotor back core.

7. An axial gap electric motor as claimed in claim 6, in which the magnets are arranged in a manner to alternately change N and S poles thereof in a circumferential direction around the imaginary common axis.

8. An axial gap electric motor as claimed in claim 7, in which the rotor back core is constructed of a plurality of flat magnetic steel sheets that are put on one another.

9. An axial gap electric motor as claimed in claim 1, in which each of the rotors comprises:
   a rotor back core;
   a plurality of magnets that are put on one surface of the rotor back core; and
   a plurality of rotor cores each being constructed of a magnetic material and arranged between two adjacent magnets while being embedded at one end in the rotor back core.

10. An axial gap electric motor as claimed in claim 9, further comprising an outer frame that is arranged to tightly hold the magnets and the rotor cores relative to the rotor back core.

11. An axial gap electric motor as claimed in claim 9, in which the magnets are arranged in a manner to alternately change N and S poles thereof in a circumferential direction around the imaginary common axis.

12. An axial gap electric motor as claimed in claim 11, in which the rotor back core and each of the rotor cores are constructed of a plurality of flat magnetic steel sheets that are put on one another and in which the flat magnetic steel sheets of each rotor core are piled in a radial direction with respect to the imaginary common axis.

13. An axial gap electric motor as claimed in claim 1, in which the first and second stators and the rotors are so arranged that under operation of the motor, there are produced a first group of loops of magnetic flux each flowing from a surface of the first stator into one rotor which faces the first stator and flowing through the one rotor in an axial direction and a second group of loops of magnetic flux each flowing from a surface of the second stator into another rotor which faces the second stator and flowing through the another rotor in an axial direction.

14. An axial gap electric motor as claimed in claim 1, wherein the rotors are configured to rotate independently of one another.

15. An axial gap electric motor as claimed in claim 1, further comprising a motor case;
wherein the first and second stators each comprise a stator back core that is secured to a wall surface of the motor case.

16. An axial gap electric motor, comprising:
first and second stators that are arranged on mutually spaced positions of an imaginary common axis in a manner to face each other;
a plurality of rotors that are coaxially and rotatably arranged on mutually spaced positions of the imaginary common axis between the first and second stators;
a rotor back core;
a plurality of magnets that are put on one surface of the rotor back core;
a plurality of rotor cores each being constructed of a magnetic material and arranged between two adjacent magnets while piecing the rotor back core;
an annular supporting member that is attached to the other surface of the rotor back core;
an enlarged flange formed on one axial end of each rotor core; and
a recess formed in the annular supporting member to snugly receive the enlarged flange.

17. An axial gap electric motor as claimed in claim 16, in which each rotor core is welded to the annular supporting member.

18. An axial gap electric motor as claimed in claim 17, in which the annular supporting member is constructed of a non-magnetic metal.

19. An axial gap electric motor as claimed in claim 16, in which the magnets are arranged in a manner to alternately change N and S poles thereof in a circumferential direction around the imaginary common axis.

20. An axial gap electric motor as claimed in claim 19, in which the rotor back core and each of the rotor cores are constructed of a plurality of flat magnetic steel sheets that are put on one another, and in which the flat magnetic steel sheets of each core are piled in a radial direction with respect to the imaginary common axis.

21. An axial gap electric motor comprising:
annular first and second stators that are coaxially arranged around an imaginary common axis, wherein both stators are configured to be supplied with a compound current;
annular first and second rotors that are coaxially and rotatably arranged on the imaginary common axis between the first and second stators, wherein a number of magnetic poles constituted by magnets of at least one rotor differs from a number of magnetic poles constituted by magnets of another rotor;
a hollow first rotor shaft that is rotatable about the imaginary common axis and has one axial end secured to a center portion of the first rotor to rotate therewith;
a second rotor shaft that is rotatably received in the hollow first rotor shaft and has one axial end secured to a center portion of the second rotor to rotate therewith; and
a case that houses therein the first and second stators, the first and second rotors, and the first and second rotor shafts.

* * * * *